(12) United States Patent
Kim et al.

(10) Patent No.: US 10,041,390 B2
(45) Date of Patent: Aug. 7, 2018

(54) CATALYZED PARTICULATE FILTER

(71) Applicant: Hyundai Motor Company, Seoul (KR)

(72) Inventors: Pyung Soon Kim, Suwon-si (KR); ChangHo Jung, Osan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/347,979

(22) Filed: Nov. 10, 2016

(65) Prior Publication Data
US 2017/0167335 A1 Jun. 15, 2017

(30) Foreign Application Priority Data
Dec. 14, 2015 (KR) .................. 10-2015-0178661

(51) Int. Cl.
| | |
|---|---|
| *F01N 3/10* | (2006.01) |
| *F01N 3/035* | (2006.01) |
| *B01D 53/94* | (2006.01) |
| *F01N 3/021* | (2006.01) |
| *F01N 3/08* | (2006.01) |
| *F01N 3/20* | (2006.01) |

(52) U.S. Cl.
CPC ......... *F01N 3/035* (2013.01); *B01D 53/9472* (2013.01); *F01N 3/0211* (2013.01); *F01N 3/0821* (2013.01); *F01N 3/0842* (2013.01); *F01N 3/2066* (2013.01); *B01D 2255/904* (2013.01); *B01D 2255/9035* (2013.01); *B01D 2255/9155* (2013.01)

(58) Field of Classification Search
CPC .... F01N 3/2066; F01N 3/0842; F01N 3/0211; F01N 3/035; B01D 2255/904
USPC ............ 422/177, 180, 117; 55/523; 502/100
See application file for complete search history.

(56) References Cited

U.S. PATENT DOCUMENTS

| | | | |
|---|---|---|---|
| 2014/0154145 A1* | 6/2014 | Aoki ................... | B01J 35/0006 422/180 |
| 2015/0152768 A1* | 6/2015 | Arulraj ................. | F01N 3/2828 428/117 |

FOREIGN PATENT DOCUMENTS

| | | |
|---|---|---|
| JP | 2013-32706 A | 2/2013 |
| JP | 5258426 B2 | 8/2013 |
| JP | 5813965 B2 | 11/2015 |

\* cited by examiner

*Primary Examiner* — Tom P Duong
(74) *Attorney, Agent, or Firm* — Morgan, Lewis & Bockius LLP

(57) ABSTRACT

A catalyzed particulate filter may include at least one inlet channel extending in a longitudinal direction, and having a first end into which fluid flows and a second end which is blocked; at least one outlet channel extending in a longitudinal direction, and having a first end which is blocked and a second end through which the fluid flows out; at least one wall that defines the boundary between adjacent inlet and outlet channels and that extends in a longitudinal direction; and at least one support positioned within at least one of the at least one inlet channel and the at least one outlet channel.

4 Claims, 5 Drawing Sheets

CATALYZED PARTICULATE FILTER

CROSS-REFERENCE TO RELATED APPLICATION

The present application claims priority to and the benefit of Korean Patent Application No. 10-2015-0178661 filed on Dec. 14, 2015, the entire contents of which is incorporated herein for all purposes by this reference.

BACKGROUND OF THE INVENTION

Field of the Invention

The present invention relates to a catalyzed particulate filter, and more particularly, to a catalyzed particulate filter that minimizes an increase in back pressure and provides a longer contact time (larger contact area) between a catalyst and a fluid.

Description of Related Art

Exhaust gases from internal combustion engines such as diesel engines or a variety of combustion equipment contain particulate matter (PM). Such PMs can cause environmental pollution when emitted into the atmosphere. For this reason, gas exhaust systems are equipped with a particulate filter for capturing PM.

The particulate filter may be categorized as a flow-through particulate filter or a wall-flow particulate filter depending on the flow of fluid.

In the flow-through particulate filter, a fluid let into a channel flows only within this channel without moving to another channel. This helps minimize an increase in back pressure, but necessitates a means for capturing particulate matter in the fluid and may result in low filter performance.

In the wall-flow particulate filter, a fluid let into a channel moves to a neighboring channel and is then released from the particulate filter through the neighboring channel. That is, a fluid let into an inlet channel moves to an outlet channel through a porous wall and is then released from the particulate filter through the outlet channel. When a fluid passes through the porous wall, particulate matter in the fluid is captured without passing through the porous wall. The wall-flow particulate filter is effective at removing particulate matter, although it may increase the back pressure to some extent. Hence, wall-flow particulate filters are primarily used.

The vehicle is equipped with at least one catalytic converter, along with a particulate filter. The catalytic converter is designed to remove carbon monoxide (CO), hydrocarbon (HC), and nitrogen oxide (NOx).

The catalytic converter may be physically separated from the particulate filter, or combined with the particulate filter by coating the particulate filter with a catalyst. The particulate filter coated with a catalyst may be called a catalyzed particulate filter (CPF).

In the CPF, the catalyst is coated on the porous wall that separates the inlet channel and the outlet channel from each other, and the fluid passes through the porous wall and comes into contact with the catalyst coating. There is a pressure difference between the inlet channel and outlet channel separated by the porous wall. This allows the fluid to pass fast through the porous wall. Accordingly, the contact time between the catalyst and the fluid is short, which makes it hard for a catalytic reaction to occur efficiently.

Also, a thick catalyst coating on the porous wall allows the catalyst to block the micropores on the wall, and this may disturb the flow of the fluid from the inlet channel to the outlet channel. Accordingly, the back pressure increases. To minimize the increase in back pressure, a catalyst is thinly coated on the walls in the CPF. Thus, the amount of catalyst coating on the CPF may be insufficient for the catalytic reaction to occur efficiently.

To overcome this problem, the surface area of walls to be coated with the catalyst may be increased by increasing the number (density) of inlet channels and outlet channels (hereinafter, collectively referred to as 'cells'). However, the increase in cell density in the limited space reduces the wall thickness. The reduction in wall thickness may deteriorate the filter performance. Therefore, the cell density should not be increased to more than the density limit.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a catalyzed particulate filter that minimizes an increase in back pressure and increases catalyst loading.

Another aspect of the present invention is to provide a catalyzed particulate filter that minimizes an increase in back pressure and provides a longer contact time between a catalyst and a fluid.

An exemplary embodiment of the present invention provides catalyzed particulate filter including: at least one inlet channel extending in a longitudinal direction, and having a first end into which fluid flows and a second end which is blocked; at least one outlet channel extending in a longitudinal direction, and having a first end which is blocked and a second end through which the fluid flows out; at least one wall that defines the boundary between adjacent inlet and outlet channels and that extends in a longitudinal direction; and at least one support positioned within at least one of the at least one inlet channel and the at least one outlet channel, wherein at least two kinds of catalysts is coated on at least one inside wall of the inlet channel, at least one inside wall of the outlet channel or both surfaces of the support, and the kind of catalyst coated on at least one inside wall of the inlet channel is a same, the kind of catalyst coated on at least one inside wall the outlet channel is a same, and the kind of catalyst coated on at least one surface of both surfaces of the support is a same.

The kind of catalyst coated on at least one inside wall of the inlet channel may be different from the kind of catalyst coated on at least one inside wall of the outlet channel or the kind of catalyst coated on at least one surface of both surfaces of the support.

The different kinds of catalysts may be respectively coated on the both surfaces of the support.

The fluid flowing into through the inlet channel may pass through the wall and flow to the outlet channel.

A Lean NOx Trap (LNT) catalyst may be coated on the at least one inside wall of the inlet channel, the at least one inside wall of the outlet channel, or the at least one surface of both surfaces of the support.

A Selective Catalytic Reduction (SCR) catalyst may be coated on the at least one surface of both surfaces of the support.

The fluid flowing into through the inlet channel may pass through the catalyst coated on the wall after being contacted with the catalyst coated on a support formed in the inlet channel, and contact the catalyst coated on a support formed in the outlet channel.

Another exemplary embodiment of the present invention provides a catalyzed particulate filter including: at least one inlet channel having a first end which is opened to receive fluid thereinto and a second end which is blocked to prevent the fluid from flowing out therethrough; at least one outlet channel disposed alternately with the at least one inlet channel and having a first end which is blocked to prevent the fluid from flowing therethrough and a second end which is opened to cause the fluid to flow out; a porous wall that is placed between adjacent inlet and outlet channels and that allows the fluid in the inlet channel to flow to the outlet channel; and a support located within at least one among the at least one inlet channel and the at least one outlet channel, wherein at least two kinds of catalysts are coated on the porous wall, a support formed in the inlet channel support, or a support formed in the outlet channel, and the catalyst coated on the porous wall or the catalyst coated on the support formed in the inlet channel support the outlet channel are different from the catalyst coated on the support formed in the outlet channel.

A Selective Catalytic Reduction (SCR) catalyst may be coated on at least one of the porous wall or the support formed in the inlet channel.

An oxidation catalyst may be coated on the support formed in the outlet channel.

The oxidation catalyst may include an ammonia oxidation catalyst (AOC).

The fluid flowing into through the inlet channel may pass through a Selective Catalytic Reduction catalyst coated on the porous wall after being contacted with a Selective Catalytic Reduction catalyst coated on the support formed in the inlet channel, and contact the ammonia oxidation catalyst coated on a support formed in the outlet channel.

Another exemplary embodiment of the present invention provides a catalyzed particulate filter including: at least one inlet channel having a first end which is opened to receive fluid thereinto and a second end which is blocked to prevent the fluid from flowing out therethrough; at least one outlet channel having a first end which is blocked to prevent the fluid from flowing therethrough and a second end which is opened to cause the fluid to flow out; a porous wall that is placed between adjacent inlet and outlet channels and that allows the fluid in the inlet channel to flow to the outlet channel; and a support located within at least one among the at least one inlet channel and the at least one outlet channel, wherein at least two kinds of catalysts are coated on a first side or a second side of the porous wall, a first side or a second side of a support formed in the inlet channel, and a first side or a second side of a support formed in the outlet channel, and the catalyst coated on a first side or a second side of the support formed in the inlet channel, or the catalyst coated on a first side or a second side of a support formed in the outlet channel are different from the catalyst coated on a first side or a second side of the porous wall.

The fluid flowing into through the inlet channel may pass through the catalyst coated on the porous wall after being contacted with the catalyst coated on the support formed in the inlet channel, and contact the catalyst coated on the support formed in the outlet channel.

A Selective Catalytic Reduction (SCR) catalyst may be coated on the support formed in the inlet channel or the support formed in the outlet channel.

A Lean NOx Trap (LNT) catalyst may be coated on the porous wall.

As described above, it is possible to minimize an increase in back pressure and increase catalyst loading by forming a support within at least one among at least one inlet channel and at least one outlet channel and coating the support with a catalyst.

Moreover, the contact time between exhaust gases and the catalyst may be lengthened because the pressure difference between first and second parts of a channel separated by the support and the pressure difference between a first end and a second end of the first or second part along the length of the support are small.

In addition, sufficient filter performance and catalyst performance can be achieved since larger catalyst loading and a larger contact area (contact time) between a fluid and the catalyst are provided while keeping the wall thickness.

In addition, the temperature range for the NOx conversion can be extended since a plurality of catalysts are coated on the particulate filter including the walls.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
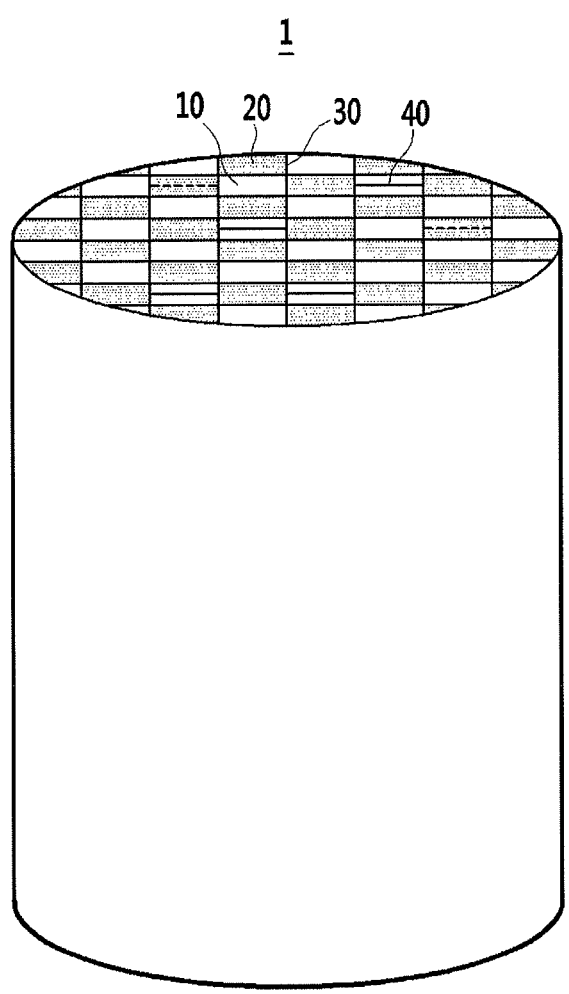
FIG. 1 is a perspective view of a catalyzed particulate filter according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

A catalyzed particulate filter according to an exemplary embodiment of the present invention is configured for use in a variety of devices, as well as vehicle, that get energy by burning fossil fuels and emit gases produced in the burning process into the atmosphere. Although this specification illustrates an example of a catalyst particulate filter configured for use in the vehicle, the present invention should not be construed as limited to this example.

The vehicle is equipped with an engine for generating power. The engine converts chemical energy into mechanical energy by the combustion of a fuel-air mixture. The engine is connected to an intake manifold to draw air into a combustion chamber, and connected to an exhaust manifold where exhaust gases produced during combustion are collected and emitted out. Injectors are mounted at the combustion chamber or intake manifold to spray fuel into the combustion chamber or intake manifold.

Exhaust gases produced from the engine are emitted out of the vehicle via an exhaust system. The exhaust system may include an exhaust pipe and exhaust gas recirculation (EGR) equipment.

The exhaust pipe is connected to the exhaust manifold to emit exhaust gases out of the vehicle.

The exhaust gas recirculation equipment is mounted on the exhaust pipe, and exhaust gases emitted from the engine pass through the exhaust gas recirculation equipment. Also, the exhaust gas recirculation equipment is connected to the intake manifold to mix some of the exhaust gases with air and control the combustion temperature. The combustion temperature may be regulated by controlling the ON/OFF of an EGR valve in the exhaust gas recirculation equipment. That is, the amount of exhaust gases supplied to the intake manifold is adjusted by controlling the ON/OFF of the EGR valve.

The exhaust system may further include a particulate filter that is mounted on the exhaust pipe and captures particulate matter in exhaust gases. The particulate filter may be a catalyzed particulate filter according to an exemplary embodiment of the present invention that removes harmful substances as well as particulate matter in exhaust gases.

Hereinafter, a catalyzed particulate filter according to an exemplary embodiment of the present invention will be described in detail with reference to the accompanying drawings.

Figure 2:
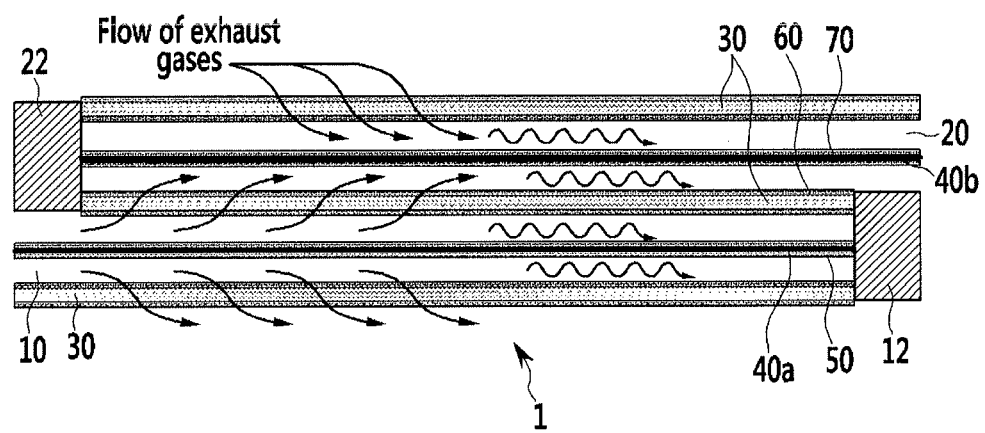
FIG. 2 is a cross-sectional view of the catalyzed particulate filter according to the exemplary embodiment of the present invention.
Figure 3:
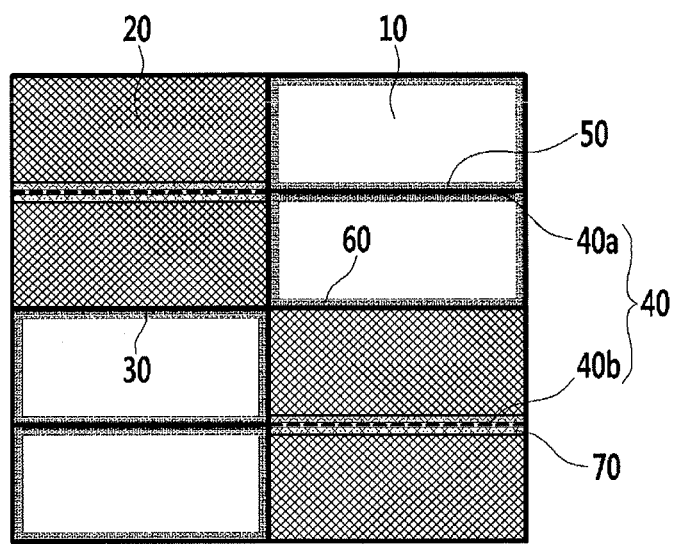
FIG. 3 is a front view illustrating some of inlet and outlet channels in the catalyzed particulate filter according to the exemplary embodiment of the present invention.

FIG. 1 is a perspective view of a catalyzed particulate filter according to an exemplary embodiment of the present invention. FIG. 2 is a cross-sectional view of the catalyzed particulate filter according to the exemplary embodiment of the present invention. FIG. 3 is a front view illustrating some of inlet and outlet channels in the catalyzed particulate filter according to the exemplary embodiment of the present invention.

As shown in FIG. 1, a catalyzed particulate filter 1 according to an exemplary embodiment of the present invention includes, within a housing, at least one inlet channel 10 and at least one outlet channel 20. The at least one inlet channel 10 and the at least one outlet channel 20 are separated from each other by walls 30. A support 40 may be located within at least one among the at least one inlet channel 10 and the at least one outlet channel 20.

In this specification, the inlet channel 10 and the outlet channel 20 may be collectively referred to as 'cells'. Although, in this specification, the housing has a cylindrical shape and the cells have a rectangular shape, the housing and the cells are not limited to such shapes.

Referring to FIG. 2 and FIG. 3, the inlet channel 10 extends along the flow of exhaust gases. The front end of the inlet channel 10 is opened so that exhaust gases are introduced into a particulate filter 1 through the inlet channel 10. The rear end of the inlet channel 10 is blocked by a first plug 12. Thus, the exhaust gases in the particulate filter 1 are kept from flowing out of the particulate filter 1 through the inlet channel 10.

The outlet channel 20 extends along the flow of exhaust gases, and may be placed parallel to the inlet channel 10. At least one inlet channel 10 is located around the outlet channel 20.

For example, when the cells have a rectangular shape, each outlet channel 20 is surrounded by walls 30 on four sides. At least one of the four sides is located between each outlet channel 20 and a adjacent inlet channel 10. When the cells have a rectangular shape, each outlet channel 20 may be surrounded by four adjacent inlet channels 10 and each inlet channel 10 may be surrounded by four adjacent outlet channels 20, but the present invention is not limited thereto.

Since the front end of the outlet channel 20 is blocked by a second plug 22, exhaust gases are kept from flowing into the particulate filter 1 through the outlet channel 20. The rear end of the outlet channel 20 is opened so that exhaust gases in the particulate filter 1 flow out of the particulate filter 1 through the outlet channel 20.

A wall 30 is placed between adjacent inlet and outlet channels 10 and 20 to define the boundary between them. The wall 30 may be a porous wall 30 with at least one micropore in it. The porous wall 30 allows the adjacent inlet and outlet channels 10 and 20 to fluidically-communicate with each other. Thus, the exhaust gases introduced into the inlet channel 10 may move to the outlet channel 20 through the porous wall 30. Moreover, the porous wall 30 does not let particulate matter in the exhaust gases pass through. When the exhaust gases move from the inlet channel 10 to the outlet channel 20 through the porous wall 30, the particulate matter in the exhaust gases is filtered through the porous wall 30. The porous wall 30 may be made from aluminum titanate, codierite, silicon carbide, etc.

The support 40 may be located within at least one among the at least one inlet channel 10 and the at least one outlet channel 20. The support 40 may be located only within the at least one inlet channel 10 or only within the at least one outlet channel 20. Although FIGS. 1 through 3 illustrate that the support 40 extends parallel to the direction in which the inlet channel 10 and/or the outlet channel 20 extend, the present invention is not limited thereto.

That is, the support 40 may extend perpendicular or obliquely to the direction in which the inlet channel 10 and/or the outlet channel 20 extend. In the case that the support 40 extends perpendicular or obliquely to the direction in which the inlet channel 10 and/or the outlet channel 20 extend, at least one of the two ends of the support 40 may not come into contact with the porous wall 30 that separates the cells from one another.

Meanwhile, the support 40 is provided to hold the catalyst in place, rather than serving as a filter. Thus, the support 40 is not necessarily made from a porous material. That is, the support 40 may be made from a same material as the porous wall 30 or a different material. Even in the case that the support 40 is made from a porous material, exhaust gases mostly move along the support 40 and wall 30 without passing through the support 40, because there is little difference in pressure between the two parts of the channel 10 or 20 separated by the support 40. Also, the support 40 does not need to be thick since it is not required to serve as a filter. That is, the support 40 may be thinner than the wall 30, which minimizes an increase in back pressure. For a support 40 made from a porous material, the catalyst is coated on the surface of the support 40 and on the micropores in the support 40. Contrariwise, for a support 40 made from a non-porous material, the catalyst is coated on the surface of the support 40.

The support 40 includes a first support 40a disposed in the inlet channel 10 and a second support 40b disposed in the outlet channel 20.

At least one of the first support 40a, the porous wall 30 and the second support 40b may be coated with a catalyst. The first support 40a may be coated with a first catalyst 50, the porous wall 30 may be coated with a second catalyst 60, and the second support 40b may be coated with a third catalyst 70.

The first catalyst 50, the second catalyst 60 and the third catalyst 70 may be coated with a variety of catalysts including a Lean NOx Trap (LNT) catalyst, a three-way catalyst, an oxidation catalyst, a hydrocarbon trap catalyst, a selective catalytic reduction (SCR) catalyst, etc.

At least two kinds of catalysts may be coated on the first support 40a, the porous wall 30 and the second support 40b. Furthermore, different types of catalyst may be coated on a first side and a second side of the first support 40a, the porous wall 30 and the second support 40b. For example, different types of catalyst may be coated on a first side of the porous wall 30 which is the inside wall of the inlet channel 10, and a second side of the porous wall 30 which is an inside wall of the outlet channel 20. Also, different types of catalyst may be coated on a first side and a second side of the first support 40a, and different types of catalyst may be coated on a first side and a second side of the second support 40b.

The kind of catalyst coated on the porous wall 30 which is an inside wall of the inlet channel 10 may be a same, the kind of catalyst coated on the porous wall 30 which is an inside wall of the outlet channel 20 may be the same, and the kind of catalyst coated on the both surfaces of the first support 40a or the second support 40b may be the same.

The kind of catalyst coated on at least one inside wall of the inlet channel 10 may be different from the kind of catalyst coated on at least one inside wall of the outlet channel 20, and may be different from the kind of catalyst coated on at least one surface of both surfaces of the first support 40a or the second support 40b.

For example, according to an exemplary embodiment of the present invention, the first catalyst 50 coated on the first support 40a and the second catalyst 60 coated on the porous wall 30 may be a Lean NOx Trap (LNT) catalyst, and the third catalyst 70 coated on the second support 40b may be a Selective Catalytic Reduction (SCR) catalyst.

The Selective Catalytic Reduction (SCR) catalyst coated on the second support 40b may include a Passive SCR (pSCR) of using a NH3 exhausted from the LNT catalyst without a urea injection. The pSCR is disposed at a rear of the LNT catalyst and for a predetermined time traps NH3 generated from the LNT catalyst. The pSCR can purify the nitrogen oxide by reacting the NH3 with the nitrogen oxide in the exhaust gas.

Accordingly, according to an exemplary embodiment of the present invention, the exhaust gas flowing into through the inlet channel 10 may pass through the second catalyst 60 coated on the porous wall 30 after being contacted with the first catalyst 50 coated on the first support 40a, and contact the third catalyst 70 coated on the second support 40b.

According to another exemplary embodiment of the present invention, the first catalyst 50 coated on the first support 40a and the second catalyst 60 coated on the porous wall 30 may be a Selective Catalytic Reduction (SCR) catalyst, and the third catalyst 70 coated on the second support 40b may be an oxidation catalyst. The oxidation catalyst may include an ammonia oxidation catalyst (AOC) preventing the reducing agent from being slipped and emitted to an outside.

Accordingly, according to another exemplary embodiment of the present invention, the fluid flowing into through the inlet channel 10 may pass through the SCR catalyst coated on the porous wall 30 after being contacted with the SCR catalyst coated on the first support 40a, and contact the ammonia oxidation catalyst coated on the second support 40b formed in the outlet channel 20.

According to another exemplary embodiment of the present invention, the first catalyst 50 coated on the first support 40a and the third catalyst 70 coated on the second support 40b may be a Selective Catalytic Reduction (SCR) catalyst, and the second catalyst 60 coated on the porous wall 30 may be an Lean NOx Trap (LNT) catalyst.

Herein, the SCR catalyst coated on the first support 40a may include a carbon monoxide Selective Catalytic Reduction (CO-SCR) catalyst that uses carbon monoxide (CO) as the reducing agent. The SCR catalyst coated on the second support 40b may include a Passive SCR (pSCR) of using a NH3 exhausted from the LNT catalyst without a urea injection. The pSCR is disposed at a rear of the LNT catalyst and for a predetermined time traps NH3 generated from the LNT catalyst. The pSCR can purify the nitrogen oxide by reacting the NH3 with the nitrogen oxide in the exhaust gas.

Accordingly, according to another exemplary embodiment of the present invention, the exhaust gas flowing into through the inlet channel 10 passes through the LNT catalyst coated on the porous wall 30 after being contacted with the CO-SCR catalyst coated on the first support 40a, and contact the pSCR catalyst coated on the second support 40b.

In addition, as described above, the first catalyst 50, the second catalyst 60 and the third catalyst 70 may be coated on all the first support 40a, the porous wall 30 and the second support 40b. In this case, the amount of the first catalyst 50 coated on the first support 40a and the amount of the third catalyst 70 coated on the second support 40b may be greater than the amount of the second catalyst 60 coated on the porous wall 30. The second catalyst 60 may be thinly coated on the porous wall 30 since the porous wall 30 serves as a filter. On the contrary, the first catalyst 50 and the third catalyst 70 may be thickly coated on the first support 40a and the second support 40b since the first support 40a and the second support 40b are not required to serve as a filter. Accordingly, the amount of catalyst coating on the particulate filter 1 may be increased. Here, the amount of the first catalyst 50, the second catalyst 60 and the third catalyst 70 refers to the amount of catalyst coating per unit length or unit area.

Figure 4:
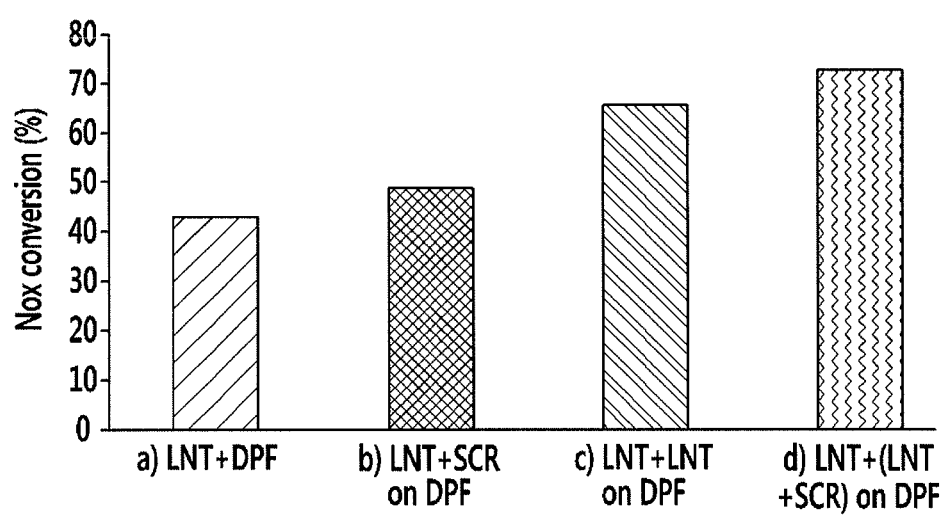
FIG. 4 is a graph illustrating the nitrogen oxide (NOx) conversion efficiency of the particulate filter coated with two kinds of catalysts according to an exemplary embodiment of the present invention.

FIG. 4 is a graph illustrating the nitrogen oxide (NOx) conversion efficiency of the particulate filter coated with two kinds of catalysts according to an exemplary embodiment of the present invention.

As shown in FIG. 4, in a case (a) when the Diesel Particulate matter Filter (DPF) is disposed at a rear of LNT catalyst without the wall like in the conventional art, since the NOx conversion efficiency is a little greater than 40%, the particulate filter needs to be improved.

However, in a case (b) when the SCR catalyst is coated on the DPF disposed at a rear of LNT catalyst, since the NOx may be additionally purified by using NH3 generated in the rich purge of the LNT catalyst, the NOx conversion efficiency can be improved. In addition, as in an exemplary embodiment of the present invention, in a case (c) when the LNT catalyst is coated on the DPF disposed at the rear on the LNT catalyst, the NOx conversion efficiency can be more improved.

In an exemplary embodiment of the present invention, since both the LNT catalyst and the SCR catalyst are coated on the DPF including additional walls, the NOx conversion efficiency can be maximized by 70% or more. In an exemplary embodiment of the present invention, it is not necessary to additionally mount the SCR catalyst, thereby reducing a volume of the particulate filter. In addition, since the SCR catalyst is coated in the same DPF, the heat loss is reduced and the NOx conversion efficiency can be improved.

Figure 5:
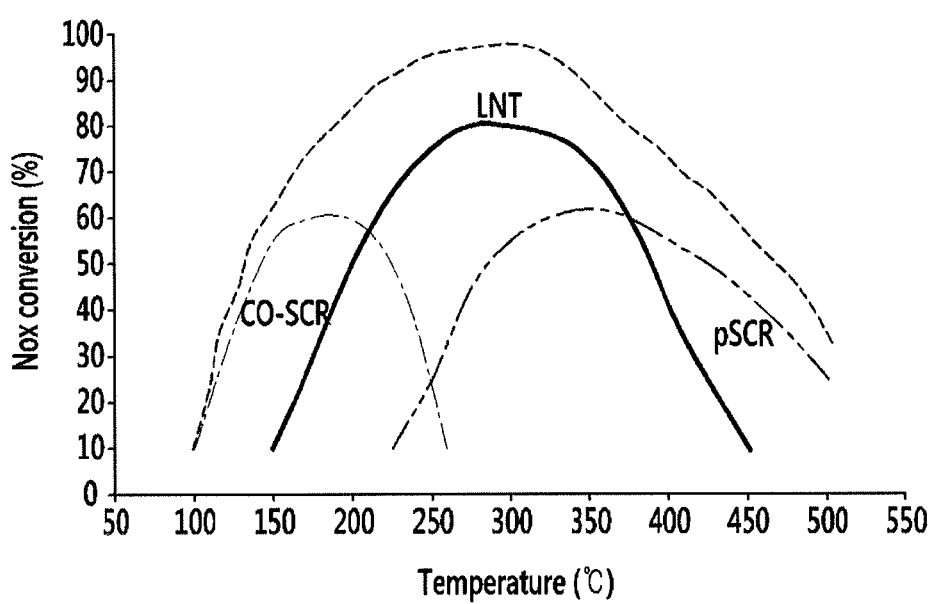
FIG. 5 is a graph illustrating the nitrogen oxide (NOx) conversion efficiency of the particulate filter coated with three kinds of catalysts according to an exemplary embodiment of the present invention.

FIG. 5 is a graph illustrating the nitrogen oxide (NOx) conversion efficiency of the particulate filter coated with three kinds of catalysts according to an exemplary embodiment of the present invention.

Referring to FIG. 5, according to an exemplary embodiment of the present invention, the CO-SCR catalyst is coated on the first support 40a, the LNT) catalyst is coated on the porous wall 30, and the pSCR catalyst is coated on the second support 40b.

Herein, the NOx conversion efficiency of the CO-SCR catalyst is high at a temperature in the range of 100° C. to 250° C., the NOx conversion efficiency of the LNT catalyst is high at a temperature in the range of 200° C. to 400° C., and the NOx conversion efficiency of the pSCR catalyst is high at a temperature in the range of 250° C. to 500° C.

Accordingly, in the particulate filter according to an exemplary embodiment of the present invention, the CO-SCR catalyst is coated on the support disposed in the inlet channel 10, the LNT catalyst is coated on the wall between the inlet channel 10 and the outlet channel 20, and the pSCR catalyst is coated on the support disposed in outlet channel 20. Therefore, the temperature range for NOx conversion can be extended.

In addition, in the particulate filter according to an exemplary embodiment of the present invention, NH3 generated in the rich condition (rich purge) of the LNT catalyst is stored in the pSCR catalyst, and then used for the NOx reduction in a lean condition. Therefore, it is possible to minimize the temperature loss generated when the pSCR is disposed at the rear of the DPF similar to the related art, and improve the NOx conversion efficiency.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A catalyzed particulate filter comprising:
at least one inlet channel extending in a longitudinal direction, and having a first end into which fluid flows and a second end which is blocked;
at least one outlet channel extending in the longitudinal direction, and having a first end which is blocked and a second end through which the fluid flows out;
at least one wall that defines the boundary between adjacent inlet and outlet channels and that extends in the longitudinal direction;
a first support positioned within the at least one inlet channel and extending in the longitudinal direction;
a second support positioned within the at least one outlet channel and extending in the longitudinal direction,
wherein a first catalyst is coated on the first support, a second catalyst is coated on the at least one wall, and a third catalyst is coated on the second support, and
wherein a kind of the first catalyst is different from that of the third catalyst.

2. The catalyzed particulate filter of claim 1, wherein each of the first catalyst and the second catalyst is a lean NOx trap (LNT) catalyst and the third catalyst is a passive selective catalytic reduction (pSCR) catalyst.

3. The catalyzed particulate filter of claim 1, wherein each of the first catalyst and the second catalyst is a selective catalytic reduction (SCR) catalyst and the third catalyst is an ammonia oxidation catalyst (AOC).

4. The catalyzed particulate filter of claim 1, wherein the first catalyst is a carbon monoxide selective catalytic reduction (CO-SCR), the second catalyst is a LNT catalyst, and the third catalyst is a pSCR catalyst.

* * * * *